No. 789,634. PATENTED MAY 9, 1905.
M. SCHROEDER.
PROCESS OF RECOVERING SULFURIC ANHYDRID AND SULFURIC ACID VAPORS
FROM GASES.
APPLICATION FILED JULY 17, 1903.
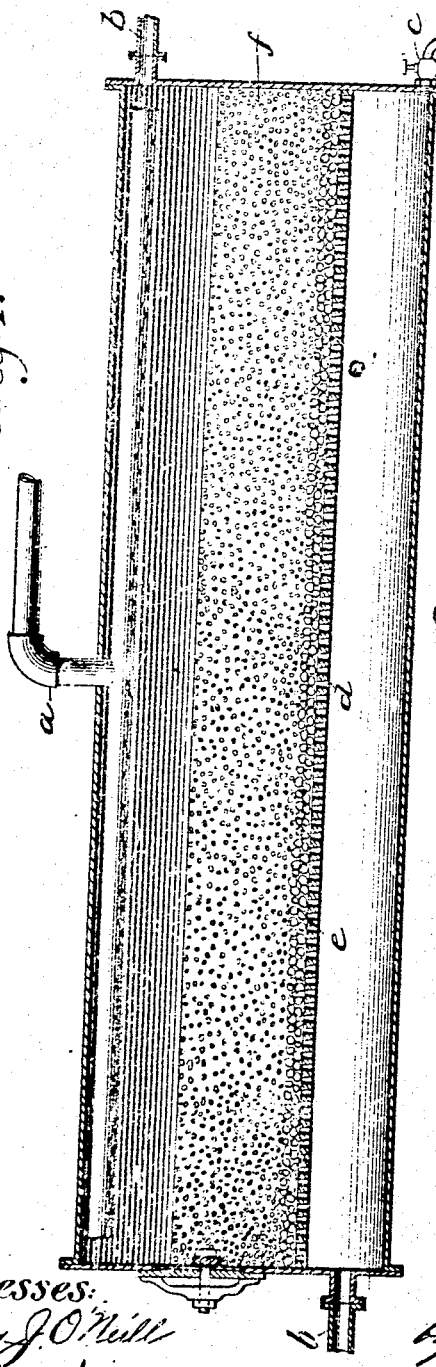
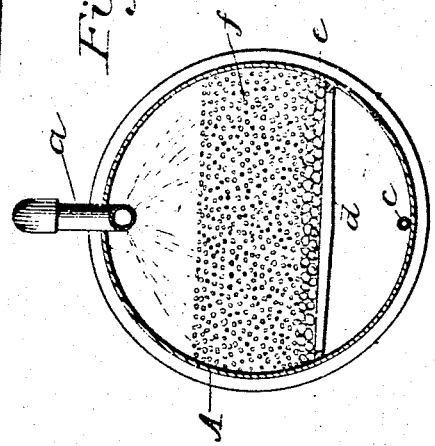
Witnesses:
Chas. J. O'Neill
M. Beall Williams
Inventor:
Max Schroeder,
by Connie & Goldsborough,
Attys No. 789,634.

Patented May 9, 1905.

UNITED STATES PATENT OFFICE.

MAX SCHROEDER, OF BERLIN, GERMANY, ASSIGNOR TO NEW JERSEY ZINC COMPANY, OF NEW YORK, N. Y., A CORPORATION OF NEW JERSEY.

PROCESS OF RECOVERING SULFURIC ANHYDRID AND SULFURIC-ACID VAPORS FROM GASES.

SPECIFICATION forming part of Letters Patent No. 789,634, dated May 9, 1905.

Application filed July 17, 1903. Serial No. 165,960.

*To all whom it may concern:*

Be it known that I, MAX SCHROEDER, a subject of the German Emperor, residing at Klopstockstrasse 45, Berlin, N. W., 23, Germany, have invented certain new and useful Improvements in Processes of Recovering Sulfuric Anhydrid and Sulfuric-Acid Vapors from Gases Containing Them; and I do hereby declare the following to be a full, clear, and exact description of the invention, such as will enable others skilled in the art to which it appertains to make and use the same.

The condensation of sulfuric anhydrid (made by the contact or catalytic process or otherwise) is effected by absorption in sulfuric acid. The more concentrated the acid the higher its capacity for absorption. If $SO_3$ gases are passed through or over ninety-nine per cent. sulfuric acid, the $SO_3$ is rapidly and completely absorbed. With ninety-five per cent. acid comparatively little mist is produced. If the strength of the absorption acid is below ninety per cent., a considerable quantity of mist is formed, and still more if weaker acid is used. This phenomenon is attributable to the fact that weak sulfuric acid gives up water-vapor to the gas, which combines with a part of the transparent $SO_3$, making $H_2SO_4$, which is visible in the gas as a fog or mist. When this fog or mist of sulfuric acid is once formed, it is almost impossible to condense it by the means heretofore employed for the purpose. The mist or fog passes through absorption acid of ninety-five to ninety-nine per cent. almost unchanged, whereas this strong acid catches $SO_3$ almost completely. The styles of apparatus heretofore employed, whether the gas is passed over the surface of the liquid or is forced through it or passed through a spray of the liquid, have shown themselves to be almost inoperative as retainers of these sulfuric-acid mists. For this reason the literature of the art is careful to point out that the sulfuric anhydrid should be absorbed by acid of at least ninety-seven per cent., and not by sulfuric acid of a materially lower degree of concentration. In many cases it is desirable to effect the absorption of the anhydrid by more dilute acids. For instance, this is the case when the absorption acid is obtained from the operation of lead chambers. Because the acid so obtained is never stronger than 60° Baumé (77.6 per cent.) it has heretofore been considered necessary to mix it with highly-concentrated or fuming acid enough to give the mixture a strength of about ninety-five per cent. or to restrict the quantity added to the acid in the absorbers to an amount that would not lower the strength of the mixture much below this point. This consumes time, and constant supervision is required to insure the proper maintenance of the grade. It is simpler to allow the weak absorption acid to flow directly into the first of a series of absorbing vessels, in which its grade is gradually raised by the absorption of $SO_3$. By dividing the absorption among several vessels in this way the evolution of heat is not so great at any point as to require artificial cooling. This method of working, however, has not been practicable, owing to the extreme difficulty of condensing the sulfuric-acid mists which are formed when sulfuric-anhydrid gases are brought in contact with comparatively dilute sulfuric acid. The present invention provides a simple method for completely and speedily condensing these sulfuric-acid mists. This method consists in passing the gases through fine-grained or fine-fibered acid-proof material, such as coarse sand, broken stone, glass-wool, or the like. In order to diminish the resistance to the passage of the gas as far as possible, the fine material should be spread out in wide layers of moderate height. The large area obtained in this way reduces the friction to such a degree that it is practically not worth considering, even if a layer of from one to one and a half meters should be employed. The receptacles for the layers of granular or fibrous material may be tight boxes or tanks, of iron or other suitable material, with appropriate gas-inlet and gas-outlet nipples and with a cock for drawing off the condensed acid. The fine material employed is placed upon a grate or perforated plate within the receptacle, upon which grate or plate a layer of coarse quartz or the like is first laid, so that the fine material will not fall through. The gas may, as desired, either enter from above and pass downwardly or from below and pass upwardly. In fact, it may be made to pass through the material in any desired direction.

In the accompanying drawings, Figure 1 represents a longitudinal section of one form or modification of apparatus adapted to the practice of the invention. Fig. 2 represents a cross-section thereof.

Referring to the drawings, A indicates the receptacle, which should be suitably lined with acid-proof material. $b$ and $b'$ indicate the gas-conduits, either of which may serve for the inlet of the gaseous mixture containing the $SO_3$ gases, according as the flow through the material is from below upward or from above downward. The grate or bottom $d$ supports the initial layer of coarser material $e$, which in its turn supports the layer of finer material $f$. A pipe $a$, terminating in a longitudinal sprinkling-head, distributes the absorption acid upon this material, as herein described. The cock for drawing off the condensed acid is indicated by $c$. If we select as the material $f$ coarse-grained sand of a diameter of one to three millimeters, one cubic meter of sand is sufficient to almost completely free about one hundred meters of the gas per hour from sulfuric-acid mists. We may also use coarser material up to about one-half-inch size of grain; but by so doing we lose in the intensity of the operation. On the other hand, the grains must not be too small, because sand that is too fine offers too great a resistance to the passage of the gases and when wet with the absorbing acid would form an impenetrable mass. It is also desirable to provide the receptacle with a sprinkling device, as shown, so that the material can be sprinkled with sulfuric acid in case the gases have not taken up sufficient water to convert all of the anhydrid to sulfuric-acid mist in the preliminary absorption plant. This free anhydrid might escape absorption unless dilute sulfuric acid was present at this point to combine with and retain it.

Having thus described my invention, what I claim is—

1. The process of separating sulfuric-acid mists or fogs from gases containing them, which consists in conducting the gases containing the said mists or fogs through a body of finely-divided material; substantially as described.

2. The process of separating sulfuric-acid mists or fogs from gases containing them and simultaneously recovering and absorbing any free sulfuric anhydrid present in such gases, which consists in conducting the gases containing them through a body of finely-divided material and saturating said material with sulfuric acid; substantially as described.

In testimony whereof I affix my signature in presence of two witnesses.

MAX SCHROEDER.

Witnesses:
HENRY HASPER,
WOLDEMAR HAUPT.